US012688289B2

(12) United States Patent
Concha et al.

(10) Patent No.: US 12,688,289 B2
(45) Date of Patent: *Jul. 21, 2026

(54) ANTIVIRUS SCANNING ARCHITECTURE FOR UPLOADED FILES

(71) Applicant: SAP SE, Walldorf (DE)

(72) Inventors: Darwin Ttito Concha, Walldorf (DE); Mark Waldaukat, Walldorf (DE); Rodrigo Augusto Scheller Boos, Blumenau (BR); Edison Kleiber Ttito Concha, Walldorf (DE)

(73) Assignee: SAP SE, Walldorf (DE)

( * ) Notice: Subject to any disclaimer, the term of this patent is extended or adjusted under 35 U.S.C. 154(b) by 142 days.

This patent is subject to a terminal disclaimer.

(21) Appl. No.: 18/464,480

(22) Filed: Sep. 11, 2023

(65) Prior Publication Data

US 2023/0418940 A1 Dec. 28, 2023

Related U.S. Application Data

(63) Continuation of application No. 17/327,850, filed on May 24, 2021, now Pat. No. 11,762,995.

(51) Int. Cl.
*G06F 21/54* (2013.01)
*G06F 21/53* (2013.01)
(Continued)

(52) U.S. Cl.
CPC ............ *G06F 21/565* (2013.01); *G06F 21/53* (2013.01); *G06F 21/54* (2013.01); *G06F 21/554* (2013.01);
(Continued)

(58) Field of Classification Search
CPC .......... G06F 21/53; G06F 21/54; G06F 21/55; G06F 21/554; G06F 21/565; H04L 67/06; H04L 67/1097; H04L 63/145
See application file for complete search history.

(56) References Cited

U.S. PATENT DOCUMENTS 10,248,657 B2 4/2019 Prahlad et al.
10,353,603 B1 * 7/2019 Baruch ................. G06F 3/0619
(Continued)

OTHER PUBLICATIONS

"Scanning for Malware in Files Uploaded to Azure"—Stack Overflow, Mar. 24, 2020 https://stackoverflow.com/questions/60836786/scanning-for-malware-in-files-uploaded-to-azure (Year: 2020).*
(Continued)

*Primary Examiner* — Randy A Scott
(74) *Attorney, Agent, or Firm* — Buckley, Maschoff & Talwalkar LLC

(57) ABSTRACT

Provided is a system and method which perform an antivirus scan of incoming files via a file management application of a file system. Infected files can be prevented from being stored to the file system. In one example, the method may include receiving, via a first application contained in a first data container, a data file that is uploaded for storage to a file system, storing the data file in a temporary storage, transmitting a location of the data file in the temporary storage to a second application contained in a second data container, and receiving, via the first application contained in the first data container, a response from the second application contained in the second container, indicating results of a security scan performed on the data file.

17 Claims, 7 Drawing Sheets

100

(51) Int. Cl.

| | |
|---|---|
| *G06F 21/55* | (2013.01) |
| *G06F 21/56* | (2013.01) |
| *H04L 67/06* | (2022.01) |
| *H04L 67/1097* | (2022.01) |

(52) U.S. Cl.
CPC .......... *H04L 67/06* (2013.01); *H04L 67/1097* (2013.01); *G06F 21/55* (2013.01)

(56) References Cited

U.S. PATENT DOCUMENTS

| | | | | |
|---|---|---|---|---|
| 10,824,726 | B1 | 11/2020 | Herman Saffar et al. | |
| 11,616,787 | B1 * | 3/2023 | Chhabra | H04L 63/104 |
| | | | | 726/1 |
| 2018/0157517 | A1 * | 6/2018 | Dong | G06F 9/45558 |
| 2020/0218798 | A1 * | 7/2020 | Kosaka | G06F 9/451 |
| 2020/0241903 | A1 * | 7/2020 | Wang | H04L 61/5007 |
| 2022/0318050 | A1 * | 10/2022 | Gokam | G06F 9/4875 |

OTHER PUBLICATIONS

"Empirical Study on Anti-Virus Architecture for Container Platforms"—Han et al, IEEE Xplore, Aug. 3, 2020 https://ieeexplore.ieee.org/document/9127954 (Year: 2020).*

892 Form dated Nov. 2, 2022 which was received in connection with U.S. Appl. No. 17/327,850.

892 Form dated Mar. 13, 2023 which was received in connection with U.S. Appl. No. 17/327,850.

892 Form dated Jun. 23, 2023 which was received in connection with U.S. Appl. No. 17/327,850.

Han et al: "Empirical Study on Anti-Virus Architecture for Container Platforms" , IEEE Access, Aug. 3, 2020 https://ieeexplore.ieee.org/stamp/stamp.jsp?arnumber=9127954 (Year: 2020).

\* cited by examiner

Receiving a Data File via a First Application
in a First Data Container

410

Storing the Data File in a Temporary
Storage

420

Transmitting a Location of the Data File in the
Temporary Storage to a Second Application
in a Second Data Container

430

Receiving a Result of a Virus Scan of the
Data File from the Second Application

440

ANTIVIRUS SCANNING ARCHITECTURE FOR UPLOADED FILES

CROSS-REFERENCE TO RELATED APPLICATION

This application is a continuation of U.S. patent application Ser. No. 17/327,850, which was filed on May 24, 2021, in the United States Patent and Trademark Office, the entire disclosure of which is hereby incorporated for all purposes.

BACKGROUND

A file system controls how data is stored and retrieved from a storage device such as a hard disk drive, a solid-state drive (SSD), a magnetic tape drive, an optical disc, main memory (e.g., random access memory (RAM)), and the like. Meanwhile, a distributed file system controls how data is stored across a distribute group of storage devices. The file system may include various directories such as physically shared directories which reside on a global host, logically shared directories which reside on a local host by have links to the global host, and local directories which reside only on the local host. Other systems such as databases can be built on top of the general data storage services provide by the file system.

In a cloud computing environment, a file system may be used to provide traditional file system protocols to applications hosted by the cloud computing environment. To help reduce the complexity within the cloud, cloud computing environments may rely on container-centric software, for example, KUBERNETES®, etc., for deploying and operating cloud applications inside containers. Each container may include the data needed to run a corresponding application included in the container such as application code, system libraries, default values, and the like. Multiple containers (multiple applications) may be grouped together into a pod for more efficiency. To write data to a file system of the cloud computing environment, a containerized application may send a write request to the file management application.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating an architecture of a host platform implementing containerized applications in accordance with an example embodiment.

Figure 2A:
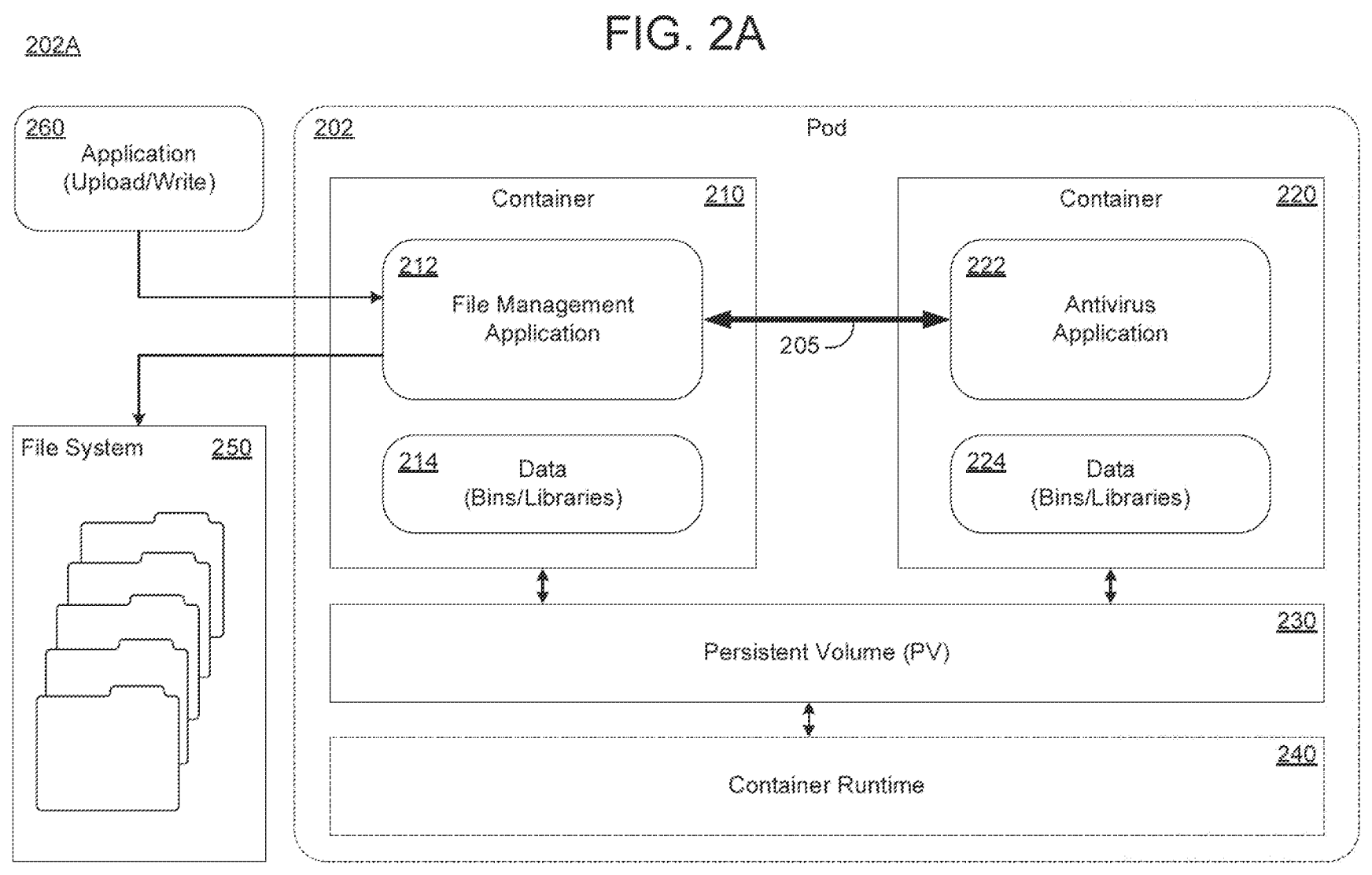

FIG. 2A is a diagram illustrating an antivirus scanning architecture integrated into a file system management application in accordance with an example embodiment.

FIG. 3A is a diagram illustrating a communication process between a file management application and an antivirus application in accordance with an example embodiment.

Figure 2B:
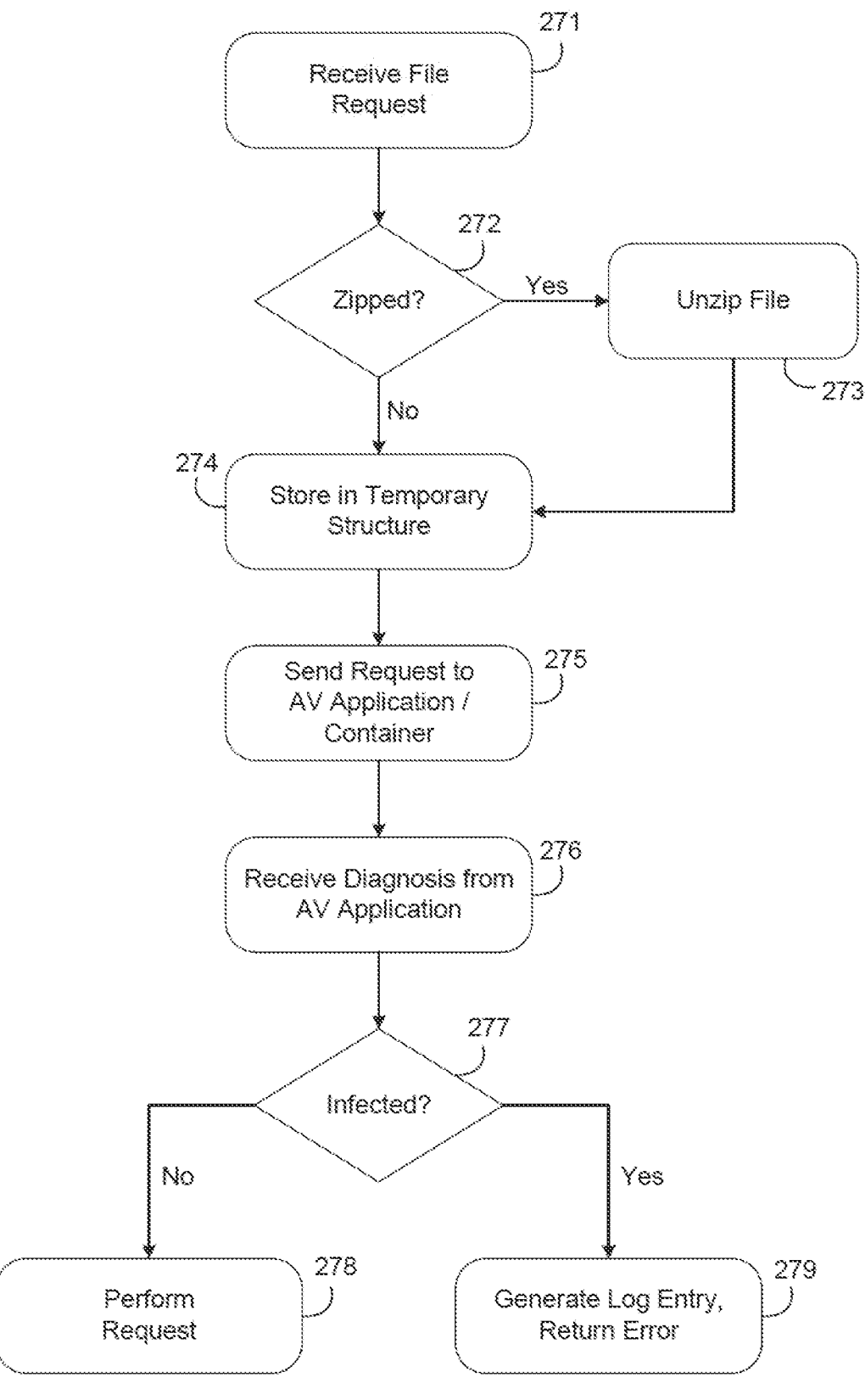
FIG. 2B is a diagram illustrating a process of scanning a file via the antivirus scanning architecture of FIG. 2A, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

File systems are critical for data integrity and security in a hosted computing environment such as a cloud platform. Data protection techniques such as access control and sanity checking can help alleviate some of the security threats to a file system. However, a file system can still suffer from malware attacks, viruses, and other security breaches which can result in severe damage such as data loss, data leakage, denial of service (DoS), system crashes, and even full-system compromise. Root directories and other shared directories of a file system may be made available to all users of an organization (or even the public). Furthermore, when a new directory is created on the file system, the new directory typically inherits the features of its parent directory. The same is true when files (e.g., documents, images, streaming files, spreadsheets, objects, etc.) are stored within the directory. These files become viewable and available to the users of the organization.

Viruses, worms, malware, and the like, can come from infected files that are obtained from website downloads, file transfer protocol (FTP) downloads, infected personal computers (PCs), discs, and the like, within the organization. While most company's scan the PCs on the organization's network, the file system itself is never scanned. Furthermore, file systems often store private/protected data of the users of an organization. Therefore, scanning the file system should limit the possible threat of the user data from being sniffed or otherwise confiscated from a malicious user on the network.

The example embodiments are directed to an antivirus scanning architecture for a file system that address the security vulnerabilities mentioned above. In particular, the architecture may be integrated into a host platform (e.g., a cloud platform, etc.) which manages applications using containers. For example, a file system may be managed by a file system manager that is contained within a first container. Here, the first container may be included within a pod that is hosted by the cloud platform. An antivirus application included within a second container may be added to the pod, and become a sidecar container of the first container that includes the file system manager. In this example, the antivirus application can directly connect to the file manager application using a network socket between the two containers.

Each time a file is uploaded by an application to the file system, the file system manager may intercept the file, and store the file in a temporary storage. For example, the temporary storage may be included within a persistent volume (PV) of the pod. The file system manager may request a file path to the newly uploaded file in the temporary storage and forward the file path to the antivirus application in the second container via the network socket. The file path may identify the folder location (e.g., folder name or path of names) of the file's location within the temporary storage. In response, the antivirus application may retrieve the newly uploaded file from the PV and may scan the newly uploaded file for any security issues such as malware, viruses, worms, and the like. Furthermore, the antivirus application may return the results of the scan to the file system manager. Based on the results, the file system manager may determine to continue the original operation (i.e., to write the newly uploaded file to the file system). However, if the scan comes back with an issue, the file system manager may log the issue within the PV, and return an error to the application that uploaded the file.

Figure 1:
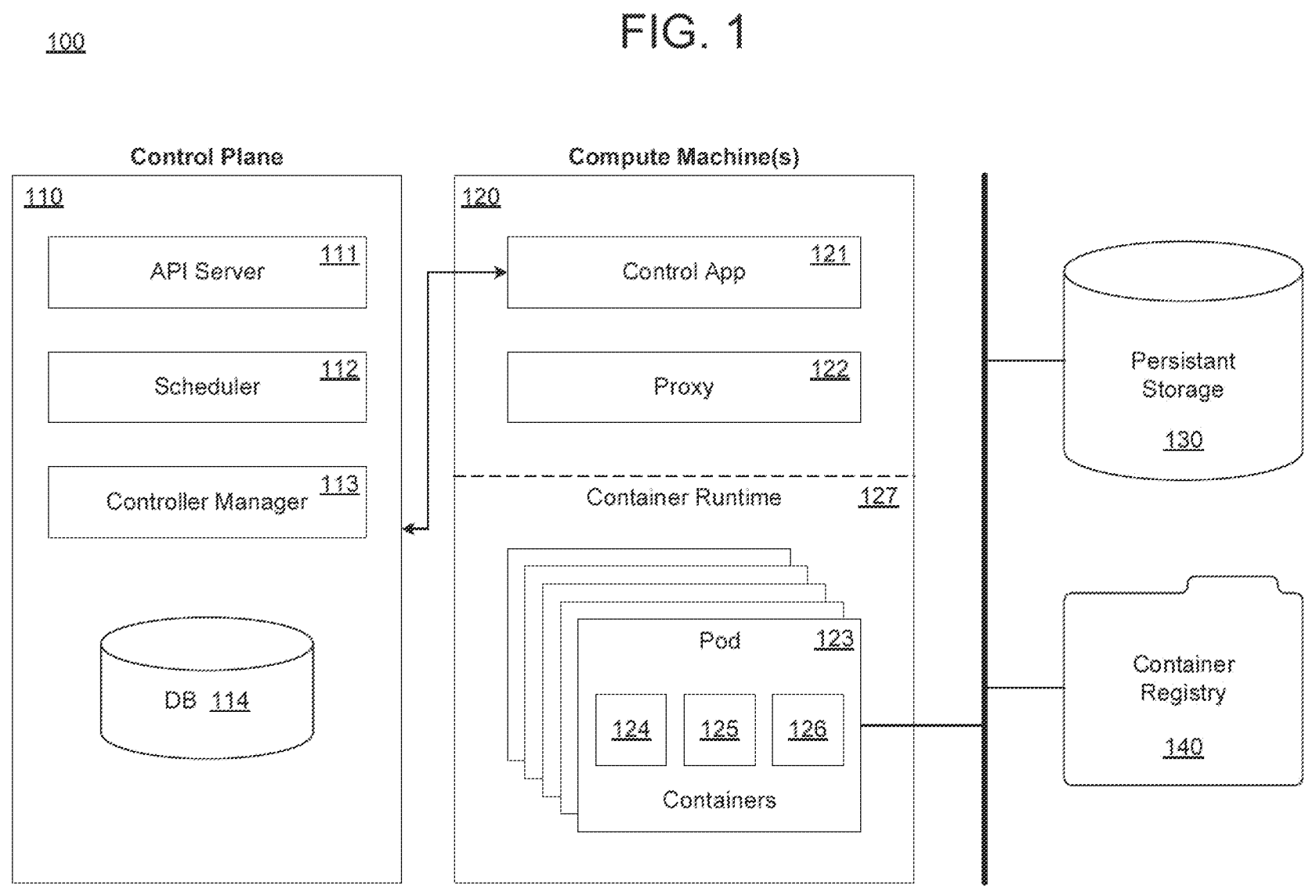

FIG. 1 is a diagram illustrating an architecture of a host platform 100 implementing containerized applications in accordance with an example embodiment. For example, the host platform 100 may be a cloud platform, a web server, a database, and the like. In some embodiments, the host platform 100 may be a distributed group of devices that work together to manage applications, data, and the like. The architecture shown in FIG. 1 may be referred to as a cluster. Although not shown in FIG. 1, the cluster may be hosted by a set of nodes of the host platform 100 that run containerized applications where the applications are packaged into containers along with the data necessary for running the applications such as libraries, bins, initial data values, and the like. The cluster may include a control plane 110 and compute machines 120 (also referred to as compute nodes).

A cluster must include at least one computing machine 120. The control plane 110 is responsible for managing the compute machine(s) 120 and ensuring that the cluster is running as configured by the organization. The control plane 110 is in constant communication with the computing machines 120. In this example, the control plane 110 may include an API server 111 that is the front-end of the control plane 110. In this example, the API server 111 may handle internal and external requests from an operator. In particular, the operator may input commands through API calls to the API server 111 to configure the computing nodes 120. Here, the API server 111 may determine if the request is valid, and process the valid requests.

The control plane 110 may also include a scheduler 112. The scheduler 112 considers the resources of a pod (a set of containerized applications grouped together) and schedules the pod to an appropriate computing machine 120. The control plane 110 may also include a controller manager 113 that controls how the cluster is run. For example, the controller manager 113 may consult the scheduler 112 and ensure that the correct number of pods are running. If a pod goes down, the controller manager 113 may respond. The controller manager 113 may connect services to pods, so requests go to the correct endpoints. The controller manager 113 may also create accounts and API access tokens. Furthermore, the database 114 may store the configuration data of the cluster.

Meanwhile, each computing machine 120 may host one or more pods 123 within a container runtime 127 of the computing machine 120. The scheduler 112 may schedule and orchestrate the pods 123 to run on the computing machines 120. Each pod 123 may include a container or a series of containers (e.g., tightly coupled) along with options that govern how the containers are run. In the example of FIG. 1, the pod 123 includes containers 124, 125, and 126, which are included therein. The pods 123 and the containers 124, 125, and 126, can be connected to a persistent storage 130 to obtain persistent volumes (PVs) for storage of data and for maintaining state of the applications in the containers 124, 125, and 126.

Each computing machine 120 may also include a control application 121 and a proxy 122. The control application 121 may communicate with the control plane 110 and ensure that the containers are running as they are supposed to be in the pods 123. When the control plane 110 needs an action to occur in a computing machine 120, the control plane 110 sends the request to the control application 121, which carries out the request. The proxy 122 is a networking proxy which facilitates networking communications inside the cluster and outside the cluster. The computing machines 120 may also communicate with a container registry 140 which includes information (e.g., images) of the containers in each pod 123. The container registry 140 may also be used to pull the images down to the pods 123 if needed.

FIG. 2A illustrates an antivirus scanning architecture 200A integrated into a file system management application in accordance with an example embodiment, and FIG. 2B illustrates a process 270 of scanning a file via the antivirus scanning architecture of FIG. 2A, in accordance with an example embodiment. Referring to FIG. 2A, the architecture 200 includes a file management application 212 that has been containerized into container 210. For example, the container 210 may include data 214 for running the file management application 212 including libraries, binary files, and the like. The file management application 212 may persist data stored to a file system 250. Also, the file management application 212 may be used to read the data, update the data, modify the data, and the like, within the file system 250.

In the example of FIG. 2A, the file management application 212 may connect to an antivirus application 222 for scanning files that are uploaded to the file management application 212 for storage on the file system 250. The antivirus application 222 is containerized within a container 220 that is a sidecar container to the container 210 which contains the file management application 212. Here, the container 220 may include data 224 for running the antivirus application 222 including libraries, binary files, and the like. The containers 210 and 220 may be included within a pod 202 hosted by a host platform. Here, the pod 202 may correspond to the pod 123 shown in FIG. 1. The pod 202 may include a persistent volume 230 which is accessible to both of the containers 210 and 220. The persistent volume 230 may include a piece of storage in the cluster that has been provisioned by an administrator or dynamically provisioned by the system. The applications 212 and 222 within the pod 202 can request storage to the persistent volume 230. Furthermore, the pod 202 includes a container runtime 240 that enables the computing machine to run containerized applications.

Referring to FIGS. 2A and 2B, a cloud application 260 may attempt to upload a new file to the file system 250. For example, the cloud application 260 may request the file management application 212 to store/write the new file to the file system 250. Accordingly, in 271, the file management application 212 receives a request to store the new file in the file system 250. In response, in 272, the file management application 212 can detect whether or not the newly uploaded file is zipped. If the newly uploaded file is not zipped, the newly uploaded file is stored within the persistent volume 230, in 274. If, however, the newly uploaded file is zipped, the file management application 212 may unzip the file in 273 and store the unzipped file in the persistent volume in 274. For example, the persistent volume 230 may include a temporary database or other data structure that temporarily holds data files until they have been successfully scanned by the antivirus application 222.

In 275, the file management application 212 sends a request to scan the newly uploaded file to the antivirus application 222. For example, the request may include an identifier of a file path within a temporary storage of the persistent volume 230 where the newly uploaded file is being temporarily stored. The request may be sent from the file management application 212 to the antivirus application 222 via a TCP connection. For example, each of the first and second containers 210 and 220 may include one or more sockets or endpoints. Each socket may be assigned a port number and an IP address. Here, a channel 205 can be established between ports of the first and second containers 210 and 220. Thus, the file management application 212 and the antivirus application 222 may exchange data via the established TCP channel 205.

In response to the request, the antivirus application 222 retrieves the newly uploaded data file from the persistent volume 230 and performs an antivirus scan, malware scan, etc., on the newly uploaded file. Here, the antivirus application 222 can diagnose the newly uploaded file as OK, Warning, Infected, etc. The antivirus application 222 may transmit the diagnosis to the file management application 212, in 276. In 277, the file management application 212 can determine whether or not the newly uploaded file is infected (or another warning identified by the antivirus application 222) based on the diagnosis, and determine whether or not to continue upload the file submitted by the cloud application 260. For example, the file management application 212 may identify that the newly uploaded file has passed the antivirus scan in 277, and store the newly uploaded file in the file system 250, in 278. As another example, the file management application 212 may identify that the newly uploaded file has failed the antivirus scan in 277, and in response, generate a log entry in the persistent volume of the antivirus scan, and return an error message to the cloud application, in 279.

In the example embodiments, the file management application 212 may be responsible for persisting data to the file system 250. The architecture enables antivirus/malware scanning of all data files that are uploaded to the file system 250, prior to storage on the file system 250. Furthermore, a TCP socket connection can be established between containers 210 and 220 of the file management application 212 and the antivirus application 222, enabling requests to be uploaded directly between the two applications. Furthermore, transferring the newly uploaded file from the file management application 212 to the antivirus application 222 may be time consuming. According to various embodiments, a location of the newly uploaded file within a temporary storage of the persistent volume 230 may be transmitted from the file management application 212 to the antivirus application 222 instead of transmitting the actual file. That is, the architecture provides a unique configuration in which containerized applications included within a same pod share access to a temporary storage of the pod. Thus, the file management application 212 simply needs to forward a file path to the antivirus application 222 instead of the file itself, thereby relieving resources.

Figure 3A:
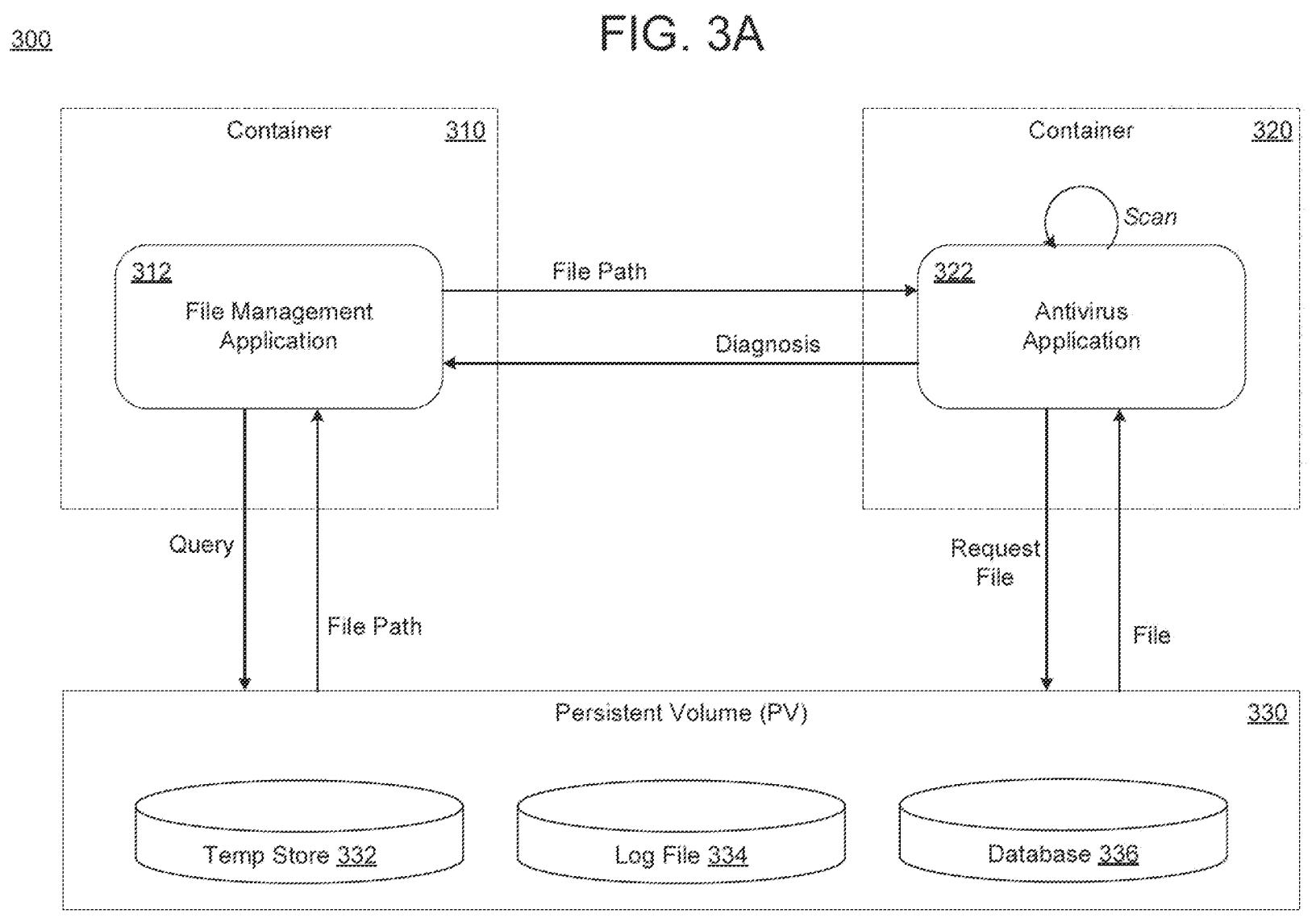
Figure 3B:
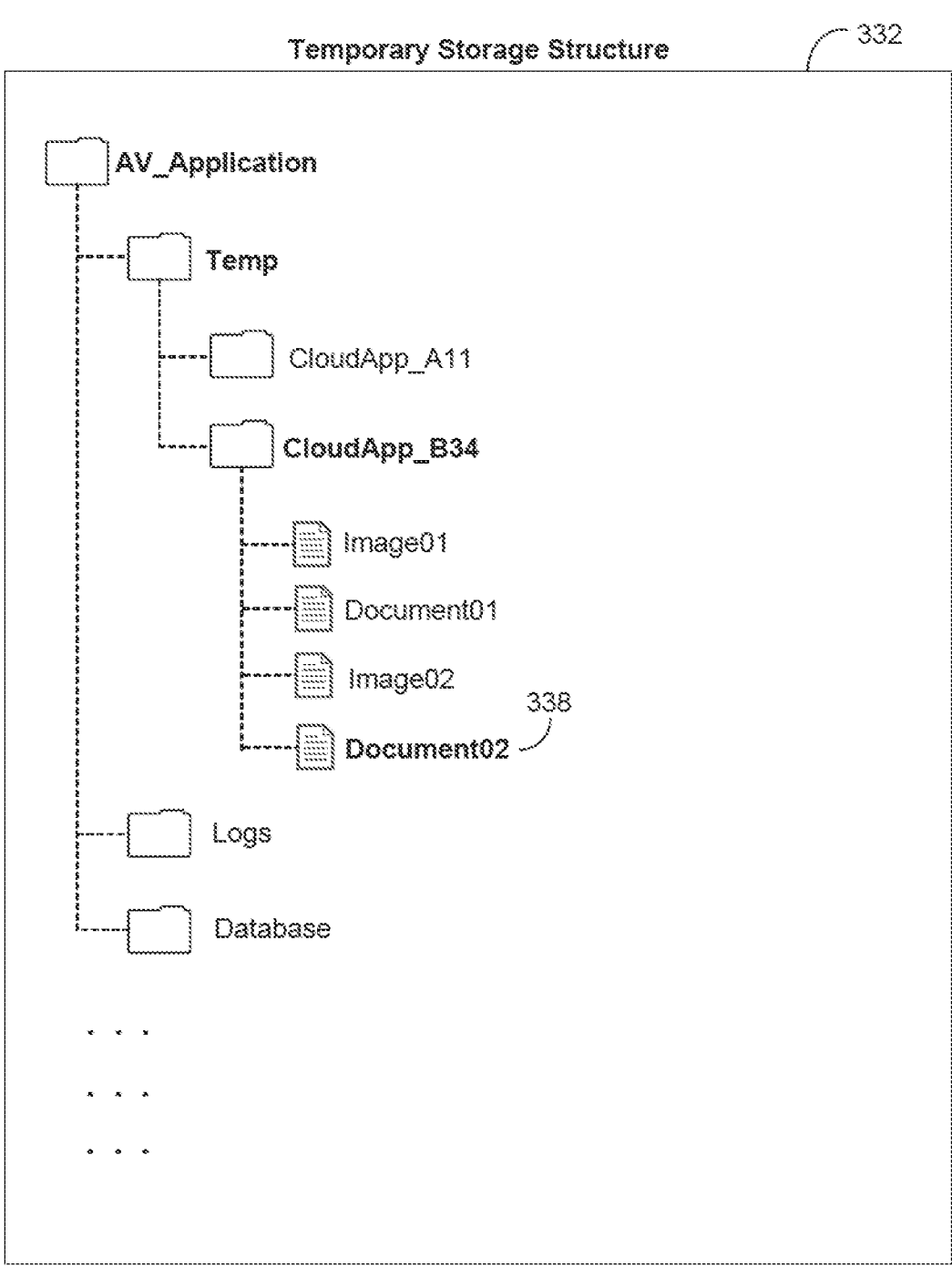
FIG. 3B is a diagram illustrating a file path location within a temporary storage structure in accordance with an example embodiment.

FIG. 3A illustrates a communication process 300 between a file management application 312 and an antivirus application 322 in accordance with an example embodiment, and FIG. 3B illustrates a file path 338 (e.g., directory location, folder location, etc.) of a newly uploaded file within a temporary storage 332 in accordance with an example embodiment. Referring to FIG. 3A, the file management application 312 is included in a container 310 and the antivirus application 322 is included in a container 320. Here, a communication channel (e.g., TCP channel, etc.) may be established between TCP sockets of the two containers 310 and 320. Accordingly, the file management application 312 and the antivirus application 322 may communicate with each other via the established communication channel.

Furthermore, both the file management application 312 and the antivirus application 322 may store and read data from a persistent volume 330. In the example of FIG. 3A, the persistent volume 330 includes a temporary storage 332 (e.g., database, distributed ledger, object, etc.) that stores newly uploaded data files on a temporary basis until a scan can be performed of the newly uploaded data files. The temporary storage 332 can hold the newly uploaded file before it is uploaded to a file system, thereby ensuring that only non-infected files are written to the file system. The persistent volume 330 may also include a log file 334 or other log storage that is configured to store a log of the diagnosis performed by the antivirus application 322. Here, the log file 334 may be updated by either the antivirus application 322 and the file management application 312. The persistent volume 330 also includes a database 336 storing additional data of the pod that holds the containers 310 and 320. As an example, the database 336 may be an antivirus (AV) database that holds the data needed for a signature-based scanner to find and remove malicious code. For example, the database 336 may contain a series of virus signatures (or definitions), unique sequences of bytes specific to each piece of malicious code, and the like.

In some embodiments, the log file 334 may be used to store the logs that are generated by the antivirus application 322 (e.g., ClamAV, etc.) However, the logs may grow too fast and consume more disk space than desired. Therefore, in some embodiments, the logs may be redirected to a standard output (stdout) stream. In this example, for each attempt to upload a file, the persistent volume 330 may write also audit logs in the file management application 312 to record the diagnosis of the antivirus application 322.

In operation, an application, user, program, process, etc., may request an upload of a file (shown in FIG. 3B) to a file system that is managed by the file management application 312. The file may be transferred to the file management application 312 which stores the file in the temporary storage 332 of the persistent volume 330 the file path 338. The file management application 312 may retrieve the file path 338 of the newly uploaded file from the temporary storage 332. For example, the file manager 312 may transmit a command/request to the temporary storage 332 which identifies the file and receive the file path 338 back from the temporary storage 332. As another example, the file management application 312 may query the persistent volume 330 for the file path 338. In this example, the file path 338 may be represented as follows:

G://AV_Application/Temp/CloudApp_B34/Document02

Here, the file path 338 includes a sequence of folders separated with slashes which identify the folders and sub-folders where the data file is located. The file management application 312 may forward a request to the antivirus application 322 for the antivirus application 322 to scan the newly uploaded file. Here, the request may include an identifier of the file to be scanned. For example, the file management application 312 may transmit the file path 338 provided from the temporary storage 332 as the identifier of the file to be scanned rather than transmit the actual file itself. In doing so, the file management application 312 prevents file data from being lost between the file management application 312 and the antivirus application 322 and reduces the amount of computing resources needed by the system.

In response, the antivirus application 322 retrieves the newly uploaded file from the temporary storage 332 based on the file path 338 provided by the file management application 312. Next, the antivirus application 322 may scan the file for any security issues such as malware, viruses, trojan horses, and the like. The antivirus application 322 may forward the results of the scan to the file management application 312. For example, the results may identify a diagnosis of the scanned file such as infected, not infected, OK, warning, alert, etc. The file management application 312 may determine whether or not to forward the newly uploaded file to the file system based on the diagnosis from the antivirus application 322. For example, the file management application 312 may perform the original request and upload/write the file to the file system when the file is not infected. On the other hand, if the file is infected, the file management application 312 may generate a log entry identifying the file and the diagnosis, and return an error message or other notification to the application that uploaded the file.

Figure 4:
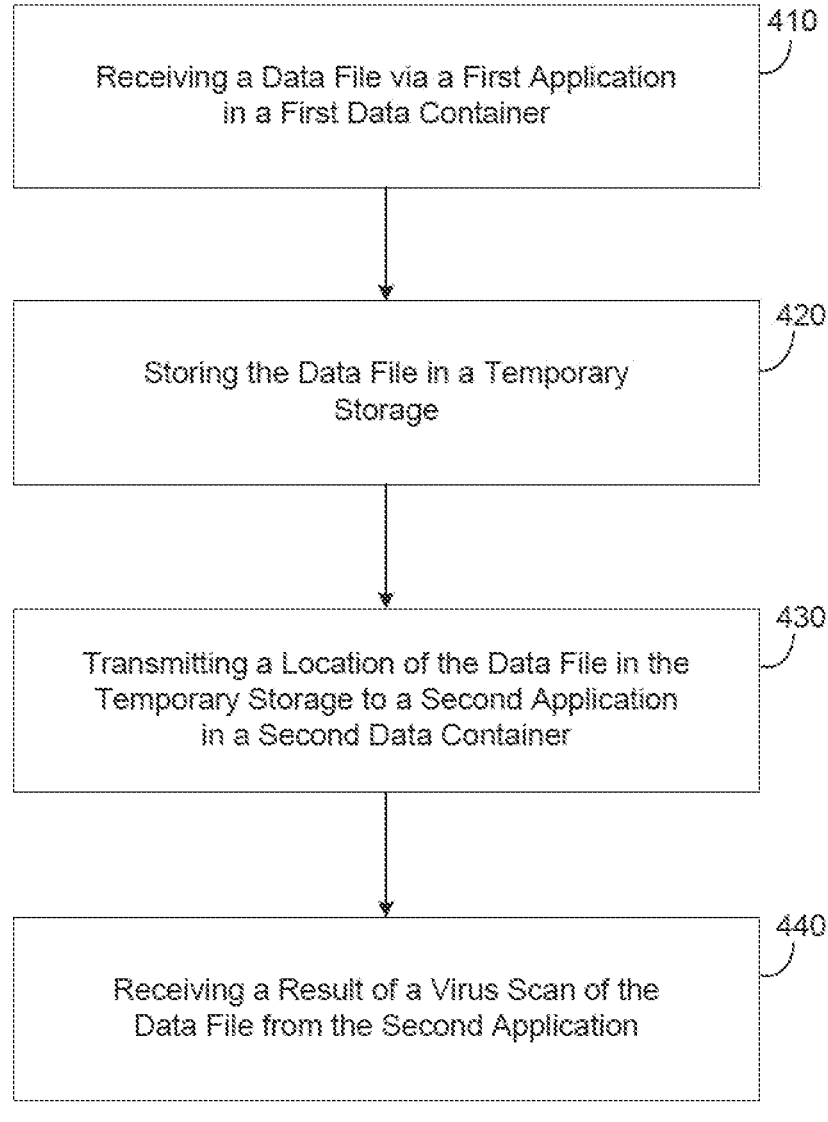
FIG. 4 is a diagram illustrating a method of scanning a file uploaded to a file system in accordance with an example embodiment.

FIG. 4 illustrates a method 400 of scanning a file uploaded to a file system in accordance with an example embodiment. For example, the method 400 may be executed by a database node, a cloud platform, a server, a computing system (user device), a combination of devices/nodes, or the like, which host a file system. Referring to FIG. 4, in 410, the method may include receiving, via a first application contained in a first data container, a data file that is uploaded for storage to a file system. Here, the data file may be uploaded by a cloud application that is hosted on a host platform. The data file may be a document, an image, a data object, a spreadsheet, a webpage, and the like. The first data container may be included within a pod. The first data container may contain the initial data values, libraries, bins, etc. for running the first application.

In 420, the method may include storing the data file in a temporary storage. As an example, the shared temporary storage may be a persistent volume (PV) within the pod. The PV may be accessible to other containerized applications that are included within the same pod. In 430, the method may include transmitting a location (e.g., file path, folder path, etc.) of the data file in the temporary storage to a second application contained in a second data container. Here, the first and second applications may be directly connected to one another within the same pod. Thus, an API or other integration mechanism is not necessary. In 440, the method may include receiving, via the first application contained in the first data container, a response from the second application contained in the second container, indicating results of a security scan performed on the data file.

In some embodiments, the method may further include detecting, via the first application contained in the first data container, that the data file is a zipped data file and unzipping the zipped data file before storing the data file in the temporary storage. For example, the first application may determine whether or not the data file is zipped. If it is not zipped, the data file may be stored in the temporary storage as is. However, if the data file is zipped, the first application can unzip the file before storing the file in the temporary storage. By unzipping the file before storing the file in the temporary storage, the example embodiments enable the virus scanner to be more efficient.

In some embodiments, the method may further include establishing a communication channel between the first and second applications via a network socket of the second data container. In this example, the transmitting may include transmitting, via the first application contained in the first data container, the location of the data file in the temporary storage to the network socket of the second data container. Here, a transmission control protocol (TCP) socket may be opened on both the first and second containers and may be used to establish a communication channel between the two applications. The TCP socket is an endpoint for communication and includes an IP address and a port number. In this example, each socket is bound to a port number so that the TCP layer can identify the container/application that the data is destined for.

In some embodiments, the transmitting may further include retrieving, via the first application contained in the first data container, a file path of the data file from the temporary storage, and transmitting the file path of the data file to the second application included in the second data container. For example, the first application may transmit a command or other request to the temporary storage for the file path in the temporary storage.

In some embodiments, the method may further include determining, via the first application contained in the first container, that the file has a security issue based on the response from the second application, logging the security issue via a data log, and returning an error notification to an application that uploaded the data file. As another example, the method may further include determining, via the first application contained in the first container, that the file has no security issues based on the response from the second application, and uploading the file to the file system.

In some embodiments, the first and second data containers are included in a common pod, and the temporary storage comprises a persistent volume (PV) that is connected to the pod. In this example, the first and second applications may share access to the temporary storage and may be able to read and write data from the temporary storage. In some embodiments, the first application contained in the first container comprises a management application for the file storage and the second application contained in the second container comprises an anti-virus scanning application.

Figure 5:
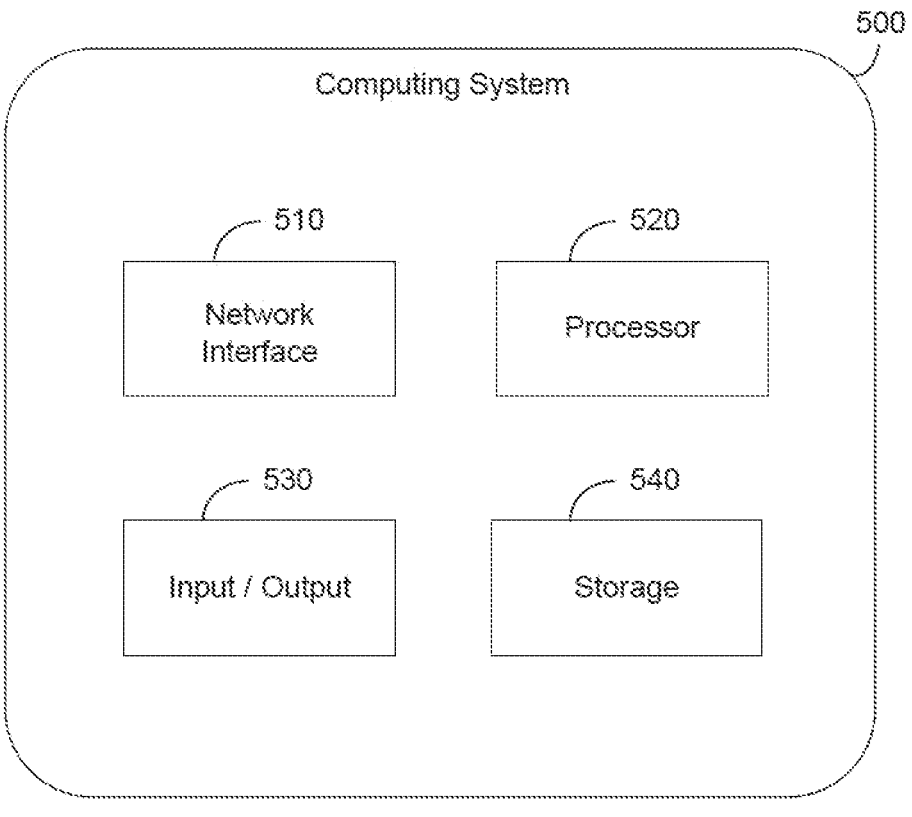
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like, which hosts containerized applications. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 5. According to various embodiments, the storage 540 may include a data store having a plurality of tables, records, partitions and sub-partitions. The storage 540 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a non-transitory computer-readable medium comprising computer-executable instructions;
   a processor configured to access the computer-executable instructions and to:
   execute a first containerized application within a pod of a host platform, the pod including a persistent volume (PV);
   execute a second containerized application within the pod of the host platform in parallel with the first containerized application, wherein the second containerized application is distinct from the first containerized application;
   establish a direct communication channel between a transmission control protocol (TCP) socket of a container of the first containerized application and a TCP socket of a container of the second containerized application within the pod; and
   exchange data between the first and second containerized applications via the established socket-to-socket communication channel directly between the first and second containerized applications during execution of the first and second containerized applications;
   wherein the PV of the pod is separate from and accessible by each of the first containerized application and the second containerized application; and
   wherein the processor is further configured to read a file from a storage location within the PV via the second containerized application, scan the file, and determine a status for the file based on the scan.

2. The computing system of claim 1, wherein the processor is further configured to open the TCP socket on the container of the first containerized application within the pod and open the TCP socket on the container of the second containerized application within the pod, prior to establishing the communication channel.

3. The computing system of claim 1, wherein the processor is configured to establish the communication channel based on an IP address of the TCP socket of the container of the first containerized application and an IP address of the TCP socket of the container of the second containerized application.

4. The computing system of claim 1, wherein the processor is further configured to establish the communication channel based on a port number of the TCP socket of the container of the first containerized application and a port number of the TCP socket of the container of the second containerized application.

5. The computing system of claim 1, wherein the processor is further configured to provision the PV within the pod, wherein the PV comprises a file store.

6. The computing system of claim 5, wherein the processor is further configured to transfer a file from the first containerized application to a storage location within the PV, and transmit an identifier of the storage location of the file within the PV to the second containerized application via the established communication channel.

7. The computing system of claim 1, wherein the processor is configured to generate a log of the data that is exchanged between the first and second containerized applications and store the log within the pod.

8. A method comprising:

executing a first containerized application within a pod of a host platform, the pod including a persistent volume (PV);

executing a second containerized application within the pod of the host platform in parallel with the first containerized application, wherein the second containerized application is distinct from the first containerized application;

establishing a direct communication channel between a transmission control protocol (TCP) socket of a container of the first containerized application and a TCP socket of a container of the second containerized application within the pod; and exchanging data between the first and second containerized applications via the established socket-to-socket communication channel directly between the first and second containerized applications during execution of the first and second containerized applications;

wherein the PV of the pod is separate from and accessible by each of the first containerized application and the second containerized application; and wherein the processor is further configured to read a file from a storage location within the PV via the second containerized application, scan the file, and determine a status for the file based on the scan.

9. The method of claim 8, wherein the method further comprises opening the TCP socket on the container of the first containerized application within the pod and opening the TCP socket on the container of the second containerized application within the pod, prior to establishing the communication channel.

10. The method of claim 8, wherein the establishing comprises establishing the communication channel based on an IP address of the TCP socket of the container of the first containerized application and an IP address of the TCP socket of the container of the second containerized application.

11. The method of claim 8, wherein the establishing comprises establishing the communication channel based on a port number of the TCP socket of the container of the first containerized application and a port number of the TCP socket of the container of the second containerized application.

12. The method of claim 8, wherein the method further comprises provisioning the PV within the pod, wherein the PV comprises a file store.

13. The method of claim 12, wherein the processor is further configured to transfer a file from the first containerized application to a storage location within the PV, and transmit an identifier of the storage location of the file within the PV to the second containerized application via the established communication channel.

14. The method of claim 8, wherein the processor is configured to generate a log of the data that is exchanged between the first and second containerized applications and store the log within the pod.

15. A non-transitory computer-readable medium comprising instruction which when executed by a processor cause a computer to perform a method comprising:

executing a first containerized application within a pod of a host platform, the pod including a persistent volume (PV);

executing a second containerized application within the pod of the host platform in parallel with the first containerized application, wherein the second containerized application is distinct from the first containerized application;

establishing a direct communication channel between a transmission control protocol (TCP) socket of a container of the first containerized application and a TCP socket of a container of the second containerized application within the pod; and exchanging data between the first and second containerized applications via the established socket-to-socket communication channel directly between the first and second containerized applications during execution of the first and second containerized applications;

wherein the PV of the pod is separate from and accessible by each of the first containerized application and the second containerized application; and wherein the processor is further configured to read a file from a storage location within the PV via the second containerized application, scan the file, and determine a status for the file based on the scan.

16. The non-transitory computer-readable medium of claim 15, wherein the method further comprises opening the TCP socket on the container of the first containerized application within the pod and opening the TCP socket on the container of the second containerized application within the pod, prior to establishing the communication channel.

17. The non-transitory computer-readable medium of claim 15, wherein the establishing comprises establishing the communication channel based on an IP address of the TCP socket of the container of the first containerized application and an IP address of the TCP socket of the container of the second containerized application.

* * * * *